United States Patent [19]

Linnenbank

[11] Patent Number: 4,935,990
[45] Date of Patent: Jun. 26, 1990

[54] DEVICE FOR CUTTING IN PARTS THE WINGS OF POULTRY

[75] Inventor: Johannes L. M. P. Linnenbank, Oostzaan, Netherlands

[73] Assignee: Meyn Machinefabriek B.V., Oostzaan, Netherlands

[21] Appl. No.: 289,549

[22] Filed: Dec. 23, 1988

[30] Foreign Application Priority Data

Jan. 5, 1988 [NL] Netherlands ............ 8800004

[51] Int. Cl.⁵ ............................................. A22C 21/00
[52] U.S. Cl. ............................................. 17/11; 17/52
[58] Field of Search ....................... 17/11, 52

[56] References Cited

U.S. PATENT DOCUMENTS

| | | |
|---|---|---|
| 4,562,613 | 1/1986 | Lewis ........................................ 17/11 |
| 4,564,976 | 1/1986 | Beech et al. ............................. 17/11 |
| 4,597,136 | 7/1986 | Hazenbroek ............................. 17/11 |
| 4,619,017 | 10/1986 | Simmons ................................ 17/11 |
| 4,651,383 | 3/1987 | van der Eerden ...................... 17/11 |
| 4,669,148 | 6/1987 | Scheier ................................... 17/11 |

Primary Examiner—Willis Little
Attorney, Agent, or Firm—Dority & Manning

[57] ABSTRACT

A device for cutting in parts the wings of poultry is provided comprising wing guide means (16, 17, 12) for exactly positioning the wing to be cut relative to a cutting device (21). These wing guide means comprise at least a horizontal guide plate (16), a vertical guide plate (17) and a lower wing guide (12), that together form a passage for the wing to be cut, in which passage the cutting device (21) extends.

10 Claims, 3 Drawing Sheets

DEVICE FOR CUTTING IN PARTS THE WINGS OF POULTRY

The invention relates to a device for cutting in parts the wings of poultry.

Such a device is known from Dutch patent application No. 83.02495. This known device comprises an endless, continuous driven conveyor with carriers for, transversely to the conveying direction of the conveyor, carrying limbs, such as wings. The carriers are provided with a number of clamping devices between which the wings, that previously have been removed from the poultry or the like, can be clampingly positioned. During the advanced motion of the conveyor the carriers pass a knife that at a desired location cuts the wings in parts.

This known device has a number of disadvantages. So, previous to using that known device, already an additional operation has to be carried out, namely separating the wings from the carcass. Next the separate wings obtained like this have to be positioned manually between the clamping means on the carriers, that operation being very labor intensive. Finally this known device does in no way guarantee the desired accuracy with respect to the location where the wings are cut in parts. Such a cut should preferably be applied between the head and the socket of a wingjoint, wherein especially the wingjoint between the humurus at one side and the ulna and radius at the other side is of special importance. Because with this known device the wings have to be positioned manually onto the carriers it can not be avoided that a certain spreading occurs in the relative position of the joint to be cut and the knife. Therefore a cut will not always be provided at the desired location. This effect is increased by the variation in dimensions of the wings.

It is an object of the invention to provide a device for cutting in parts the wings of poultry in which these disadvantages are removed in a simple, but nevertheless effective way.

To achieve that object the device according to the invention is characterized by an overhead conveyor known on itself from which the poultry is suspended with its legs and means positioned below said overhead conveyor for cutting the wings between the humerus at one side and the ulna and radius at the other side, whereby during the cutting operation the respective wing section has an exactly defined position relative to said means.

As a result of the mentioned measures it is no longer necessary that previous to cutting in parts the wings these wings have to be separated from the carcass. The overhead conveyor can be part of a processing alley in which the poultry is totally cut up. As a result cutting the wings in parts can be totally automized without any manual interference.

According to a preferred embodiment of the device according to the invention the cutting means comprise at least a wing guide means for each wing essentially extending in parallel with the transportation direction, said wing guide means comprising in cross-section an upper, essentially horizontally extending guide plate or the like, a guide plate or the like extending essentially vertically downwards from the end of the horizontal guide plate being furthest away from the poultry to be processed, as well as a lower wing guide distanced from the horizontal as well as the vertical guide plate and positioned in the quadrant delimited by both guide plates, whereas a cutting device, such as a rotating knife or the like, extends inclined inwardly from said end of the horizontal guide plate almost to the lower wing guide.

The shape of the wing guide means embodied such substantially corresponds with the natural position of the wings of the poultry that is suspended from its legs. In such a suspended position the respective wing section encloses at the joint an angle of 90°, which angle corresponds with the angle between the horizontal guide plate and the vertical guide plate. The distance from the lower wing guide towards that guide plates corresponds mainly with the expected thickness of the respective wing section. Like this it can be guaranteed that the joint will assume an exactly defined position relative to the cutting device. A shift in a vertical direction is prevented by the horizontal guide plate, whereas a shift in a horizontal direction will be prevented by the vertical guide plate. The location of the cutting device is chosen such that the cut is provided exactly at the desired location, between the head and the socket of the respective joint.

Within wide limits a variation of the dimensions of the poultry, especially the wings, has in such a case no influence on the relative position of the joint relative to the cutting device. When processing a small bird the respective joint again will be received in the wing guide in a way described before, whereby the carcass of the bird will be slightly stretched. In contrast therewith, processing a bird with larger dimensions leads to a compression of the carcass of that bird.

According to a further advantageous embodiment of the device according to the invention the cutting means encloses an angle of 30° with the horizontal guide plate. This angle of 30° guarantees in an optimal way that the cut is provided between the head and the socket of the respective joint.

Hereby it is further advantageous if the assembly of horizontal and vertical guide plates are settable away from and towards the lower wing guide in parallel with the plane of the cutting device. Such a setting can be advantageous if a different type of poultry has to be processed. Although the device guarantees within wide limits a correct positioning of the wings to be processed relative to the cutting device, in certain cases, for example if there is made a change from processing chicken to processing turkeys, a different setting of the horizontal and vertical guide plates relative to the lower wing guide can be necessary.

If the cutting device too encloses an angle of 30° with the horizontal guide plate such an adjustment leads to a smaller change of the space between the lower wing guide and the horizontal guide plate than the change of the space between the lower wing guide and the vertical guide plate. This difference in changes corresponds with the natural dimension ratios between different kinds of poultry.

Further it is handy, if, as seen in the direction of transportation of the overhead conveyor, at some distance ahead of the cutting device an upwards directing auxiliary cutting device is applied to each lower wing guide. This auxiliary cutting device cuts the skin at the lower side of the wing such that a rolling motion of this skin during the transport of the wing through the wing guide means and a corresponding disturbance of the correct position of the wing is effectively avoided.

For improving the function of the device according to the invention it is also possible that at some distance inwardly of and slightly lower than the lower wing guide a chest guide extends, or that at some distance inwardly of the horizontal guide plate, an upper wing guide extends, whereas it is also possible that at some distance above the wing guide means an inlet and passing guide extends comprising a broadened inlet end.

Hereinafter the invention will be elucidated by means of the drawing, in which an embodiment of the device according to the invention is illustrated.

Figure 1:
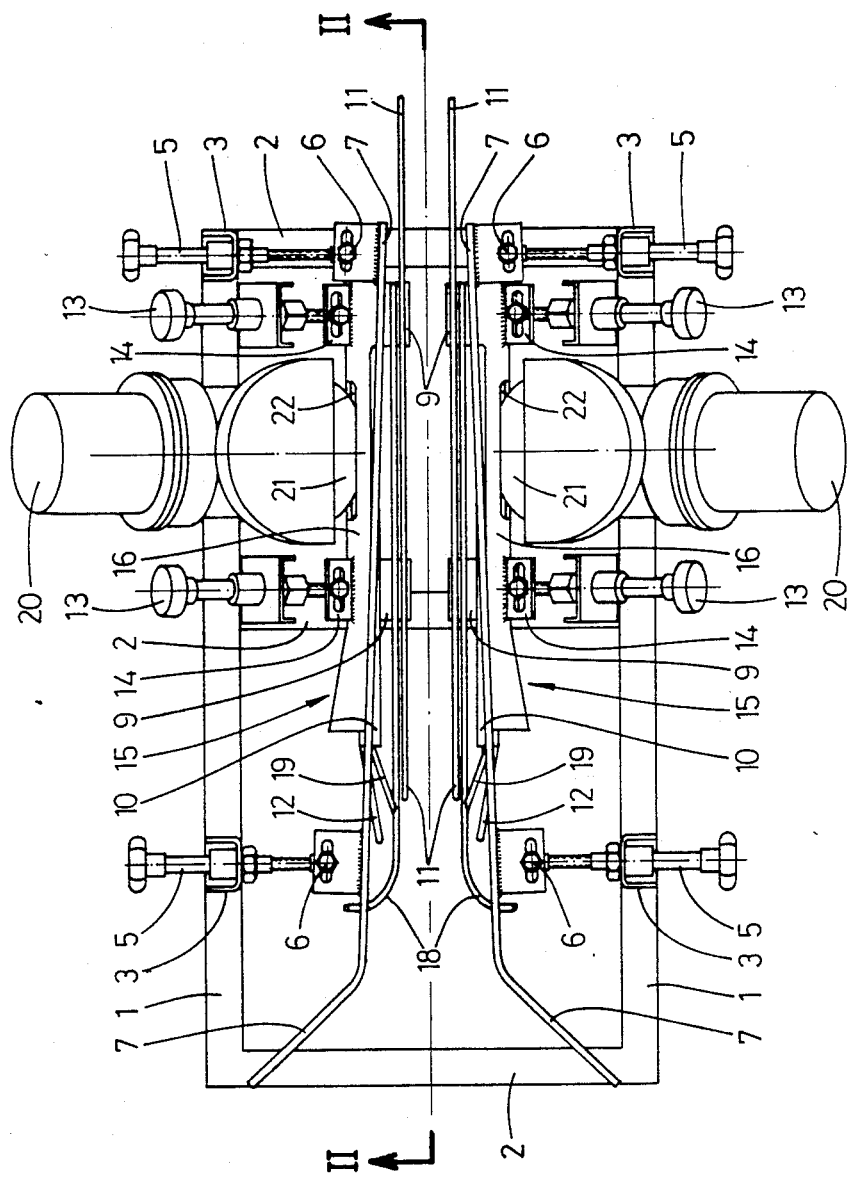
FIG. 1 shows a top plan view of an embodiment of the device according to the invention.
Figure 2:
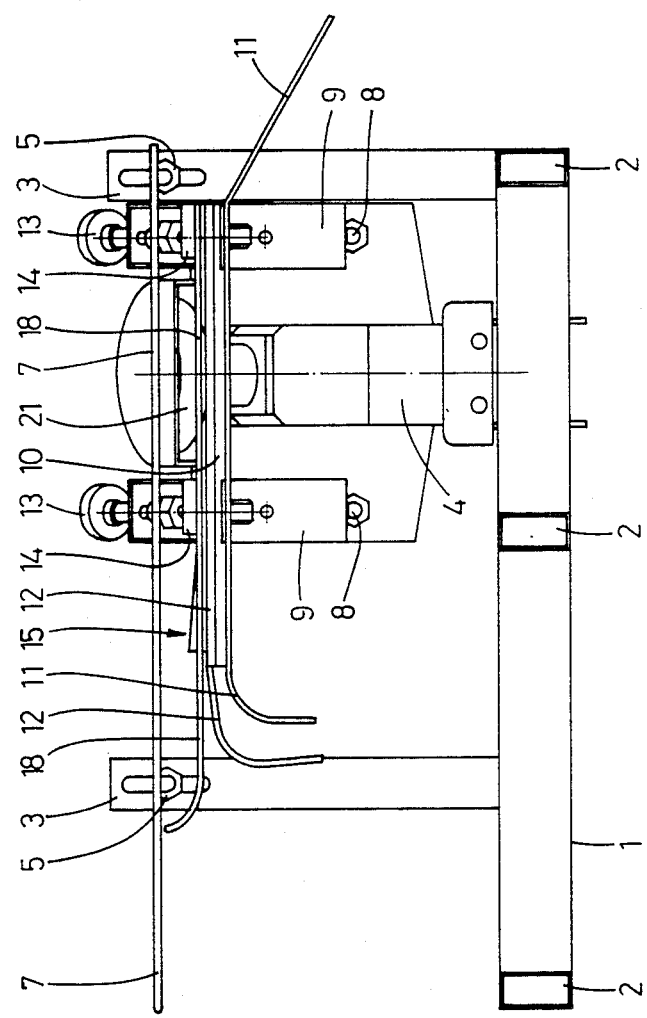
FIG. 2 shows a section according to line II—II in FIG. 1.

The device for cutting in parts the wings of poultry illustrated in the figures firstly comprises a frame with longitudinal beams 1 and transversal beams 2 interconnecting these longitudinal beams. For the connection of the several parts of the device to the frame this frame supports a number of posts 3 positioned on the longitudinal beams as well as on each longitudinal beam 1 a constructive assembly 4 not further shown in detail.

Each post 3 comprises near to its uppermost end an adjustment assembly 5, whereby always two adjustment assemblies 5 are connected with a guide rod 7 via a selfadjusting joint 7 known per se. The two opposite guide rods 7, that comprise at their forward end an outwardly bent section, form together an inlet and passing guide for the poultry to be processed with a broadened inlet end. The two guide rods 7 engage the opposite sides of the trunk of the poultry.

At each constructive assembly 4 two further adjustment assemblies 8 are attached each of which carries a mounting plate 9. At the uppersides the mounting plates 9, that are positioned at one side of the device, are interconnected by means of a connection plate 10.

Each assembly comprising two mounting plates 9 and a connection plate 10 firstly supports a guide rod 11, whereby these two guide rods 11 together form a chest guide. If the poultry is conveyed with its chest directed in the direction of transport, whereby the poultry is suspended with its legs in an overhead conveyor, the chest of the poultry slides along the mentioned chest guide.

At their foremost end the guide rods 11 of the chest guide comprise a downwards bent-away portion, simplifying the supply of the poultry in the device.

Secondly the mentioned assembly comprising two mounting plates 9 and a connection plate 10 supports a lower wing guide 12. These lower wing guides 12, which respectively extend at some distance outwardly and slightly above the corresponding guide rods 11, are meant for supporting the wings of the poultry to be cut in parts at their lower sides. At their frontal side these lower wing guides comprise a downwards and slightly outwardly bent end. The relative position of these lower wing guides 12 (as well as of the other guide rods mentioned previously and to be mentioned hereafter) will be elucidated later with respect to FIG. 4. Further each constructive assembly 4 comprises two inclinedly positioned adjustment assemblies 13 which through self adjusting joints 14 carry in pairs two angular guides 15. Each angular guide 15 comprises, as seen in cross section, an upper essentially horizontally extending guide plate 16 and a guide plate 17 extending essentially vertically downwards from the end of the horizontal guide plate being furthest away from the poultry to be processed. The position of the angular guides 15 is such that the lower wing guides 12 always will be positioned in the quadrant delimited by both guide plates 16 and 17.

The device further comprises two upper wing guides 18 that at their reverse sides are directly connected with the angular guides 15 and that near to their forward ends, that are bent away outwardly and inclinedly upwards, are connected with these angular guides 15 by means of a transverse section 19. As appears these upper wing guides always extend at some distance inwardly of the corresponding horizontal uppermost guide plate 16.

Further each constructive assembly 4 supports a rotating knife 21 driven by a motor 20, said knife extending from the corner of the angular guides 15 through a recess 22 formed therein inclinedly inwardly and upwards substantially towards the respective lower wing guide 12. The angle enclosed by the rotating knife 21 and the respective horizontal guide plate 16 preferably is 30°.

Finally the constructive assemblies 4 too comprise adjustment assemblies 23.

Figure 3:
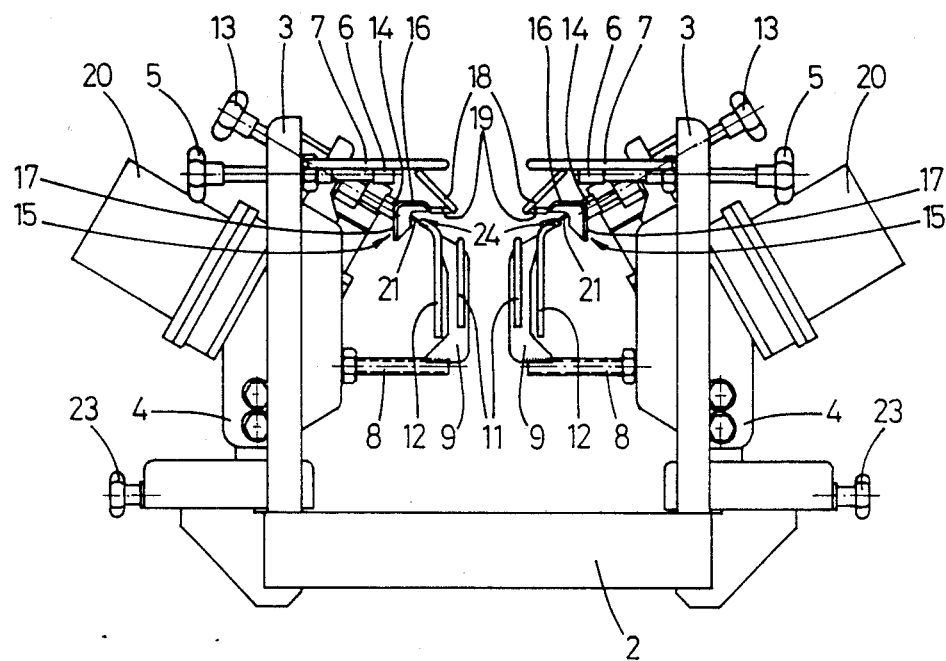
FIG. 3 shows a frontal view in the transport direction of the device represented in FIG. 1.
Figure 4:
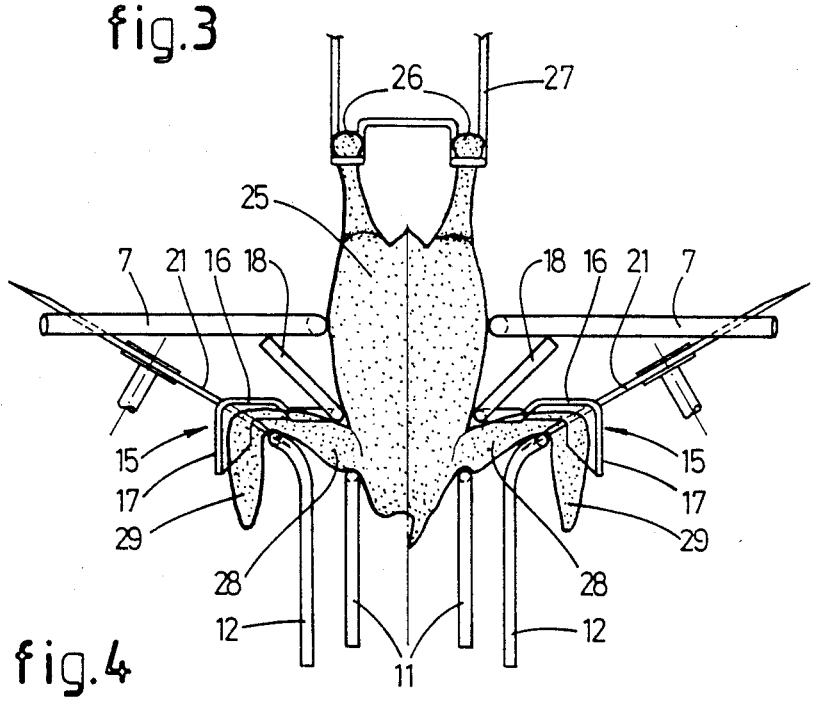
FIG. 4 shows schematically the function of the device according to the invention.

FIG. 4 shows a slaughtered bird 25, of which the head and the feathers are already removed and that is suspended with its legs 26 in an overhead conveyor 27 known per se. The view according to FIG. 4 corresponds with the view according to FIG. 3, in which one looks in the direction of transport and wherein the bird is seen from its back side.

The guide rods 7 that together form the inlet and passing guide engage the opposite sides of the trunk of the bird. The guide rods 11, that together form the chest guide, support the chest of the bird. The upper wing guides 18 engage the upper sides of the wings near to the trunk of the bird. The wings of the birds, comprising a section 28 (in which the humerus is present) near to the trunk and a section 29 (in which the ulna and the radius are present) further outwardly, which sections are interconnected by means of a joint, are enclosed by the angular guides 15 and the lower wing guides 12. The cooperation between the angular guides 15 and the lower wing guides 12 is such, that the joint between the wing sections 28 and 29 is exactly located in the plane of the rotating knife 21. Vertical displacements of the wing, and therefore the joint, are prevented by the upper guide plates 16 and the lower wing guides 12, whereas horizontal displacements of the wings, and therefore the joints, are prevented by the vertical guide plates 17 and the lower wing guides 12. In such a way the location, at which the wing of the bird is cut in pieces, is exactly defined.

If the wings are guided between the angular guides 15 and the lower wing guides 12 in the way shown in FIG. 4 there is a risk that a disturbance of the location of the wings occurs because the skin of the wings at the lower side of the wing, near to the lower wing guide 12, creates a rolling motion of these wings, which is not desired. For preventing this it is possible that, as seen in the direction of transport of the overhead conveyor 26, at some distance ahead of the knives 21 on the lower wing guides 12 upwards directed auxiliary cutting devices are provided, which have been given the reference number 24 in FIG. 3. These auxiliary cutting devices cut through the skin at the lower side of the wing, thereby avoiding the mentioned rolling motion of the wings.

As a result of the cooperation between the angular guides 15 and the lower wing guides 12 a correct position of the cut made by the knives 21 is obtained, as explained previously. This good position is also maintained if birds of different dimensions have to be processed. However, if the dimensions of the birds differ too much, for example if one changes to processing a different kind of bird, it can be handy, to change the setting of the several parts of the device. This is the function of the adjustment assemblies. Reference is made especially to the adjustment assemblies 13, through which the angular guides 15 and the upper wing guides 18 are adjustable. The angle at which these adjustment assemblies 13 are positioned corresponds with the angle of the knives 21 relative to the upper guide plates 16 of the angular guides 15. If, as already mentioned previously, this angle is 30° a displacement of the angular guides 15 will lead to a change of the distance between the lower wing guides 12 and the upper guide plates 16 and the lower wing guides 12 and the vertical guide plates 17, respectively, which corresponds with the natural thickness ratio of the wings.

The invention is not limited to the embodiment described before, but can be varied widely within the scope of the invention.

I claim:
1. A device for cutting the wings of poultry into parts while the poultry is being conveyed, comprising:
    (a) an overhead conveyor having means for gripping and holding the legs of slaughtered poultry for conveying said slaughtered poultry along a horizontal path;
    (b) guide means for engaging and guiding said slaughtered poultry as it is conveyed by said conveyor;
    (c) lower wing guide means for engaging and supporting wings of said slaughtered poultry at the joint between the humerus and the ulna sections of said wings;
    (d) angular upper guide means for engaging both the humerus and the ulna sections of said wings, in a position opposite said lower wing guide means as said slaughtered poultry is conveyed along said horizontal path to confine and support said wings in a predetermined position; and
    (e) means for cutting said wings at said joint as said poultry is conveyed along said horizontal path.

2. A device as set forth in claim 1, wherein said upper guide means comprises an essentially horizontal guide plate and an essentially vertical guide plate extending downwardly form one end of said horizontal guide plate, spaced from said lower wing guide.

3. A device as set forth in claim 2, wherein said cutting means extends inwardly on an inclined plane towards said lower wing guide.

4. A device as set forth in claim 3, wherein said cutting means extends inwardly at an angle of about 30° from the plane of said horizontal guide plate.

5. A device as set forth in claim 3, wherein said upper guide means is adjustable towards and away from the lower wing guide in a plane parallel to the plane of said cutting device.

6. A device as set forth in claim 1, further comprising an upwardly extending auxiliary cutting device disposed on said lower wing guide means.

7. A device as set forth in claim 1, wherein said guide means for engaging said slaughtered poultry comprises a breast guide which is disposed in a plane lower than the plane in which said lower wing guide means extends.

8. A device as set forth in claim 2, further comprising an upper guide for engaging the upper surface of said humerus section adjacent to the body of said slaughtered poultry.

9. A device as set forth in claim 1, wherein the positions of said guide means, said lower wing guide means, and said upper wing guide means are adjustable.

10. A device as set forth in claim 1, wherein said guide means for engaging said slaughtered poultry, said lower wing guide, and said upper wing guide comprise guide rods at their respective inlet ends and include a section bent away from said guiding section to permit said poultry to enter into said guiding means.

* * * * *